US012783054B2

(12) United States Patent
Vezzoli et al.

(10) Patent No.: US 12,783,054 B2
(45) Date of Patent: Nov. 3, 2026

(54) METHOD AND APPARATUS OF TRANSMITTING HAPTIC DATA

(71) Applicant: WYVRN, Lille (FR)

(72) Inventors: Eric Vezzoli, Lille (FR); Antoine Mariton, Lille (FR); Kah Yong Lee, Lille (FR)

(73) Assignee: WYVRN, Lille (FR)

( * ) Notice: Subject to any disclaimer, the term of this patent is extended or adjusted under 35 U.S.C. 154(b) by 14 days.

(21) Appl. No.: 18/875,847

(22) PCT Filed: Oct. 5, 2022

(86) PCT No.: PCT/EP2022/077707
§ 371 (c)(1),
(2) Date: Dec. 17, 2024

(87) PCT Pub. No.: WO2024/002508
PCT Pub. Date: Jan. 4, 2024

(65) Prior Publication Data
US 2025/0370542 A1 Dec. 4, 2025

(30) Foreign Application Priority Data
Jul. 1, 2022 (EP) .................................... 22305973
Jul. 1, 2022 (EP) .................................... 22305976

(51) Int. Cl.
*G06F 3/01* (2006.01)

(52) U.S. Cl.
CPC .............. *G06F 3/016* (2013.01); *G06F 3/011* (2013.01)

(58) Field of Classification Search
CPC .......... G06F 3/016; G06F 3/011; A63F 13/28; A63F 13/285
USPC ...................................................... 340/407.1
See application file for complete search history.

(56) References Cited

U.S. PATENT DOCUMENTS 11,132,058 B1 9/2021 Gupta et al.
2012/0268412 A1* 10/2012 Cruz-Hernandez .......................... G06F 3/0488 340/407.1
2015/0070146 A1* 3/2015 Cruz-Hernandez ...... G08B 6/00 340/407.1
2015/0070148 A1* 3/2015 Cruz-Hernandez ..... G06F 3/016 340/407.1
2015/0123775 A1* 5/2015 Kerdemelidis ......... G06F 3/016 340/407.1
2016/0012690 A1* 1/2016 Cruz-Hernandez ..... G06F 3/016 340/407.1

(Continued)

OTHER PUBLICATIONS

International Search Report from International Application No. PCT/EP2022/077707 Mar. 16, 2023, 4 pgs.

(Continued)

*Primary Examiner* — Omar Casillashernandez
(74) *Attorney, Agent, or Firm* — Tutunjian & Bitetto, P.C.

(57) ABSTRACT

Methods and apparatus of transmitting haptic data representative of a haptic effect are disclosed. Haptic device data representative of haptic rendering capabilities of a haptic rendering device is obtained. The haptic data is determined by processing received haptic data representative of the haptic effect according to the haptic device data to adapt a rendering of the haptic effect to the haptic rendering capabilities. The haptic data is transmitted to the haptic rendering device.

14 Claims, 5 Drawing Sheets

(56) References Cited

U.S. PATENT DOCUMENTS

| | | | | |
|---|---|---|---|---|
| 2016/0179198 | A1* | 6/2016 | Levesque | G06F 1/163 340/407.1 |
| 2018/0161671 | A1* | 6/2018 | Heubel | A63F 13/212 |
| 2018/0200619 | A1* | 7/2018 | Guillotel | G06F 3/011 |

OTHER PUBLICATIONS

Nicolas Mollet et al, "A Workflow for Next Generation Immersive Content", IBC 2015 Conference, Sep. 11-15, 2015, pp. 1-9, Amsterdam.

* cited by examiner

METHOD AND APPARATUS OF TRANSMITTING HAPTIC DATA

CROSS REFERENCE TO RELATED APPLICATIONS

This application claims the benefit, under 35 U.S.C. § 365 of International Application PCT/EP2022/077707, filed Oct. 5, 2022, which was published in accordance with PCT Article 21(2) on Jan. 4, 2024, in English and which claims the benefit of European patent application No. EP22305973.4 filed Jul. 1, 2022, and of European patent application No. EP22305976.7 filed Jul. 1, 2022

FIELD

The present application generally relates to the field of haptic and, in particular, to the processing of haptic related data. The present application relates to the communication of haptic related data between a haptic engine and a haptic device configured to render haptic effect(s) on one or more parts of a human body. The present application also relates to method and apparatus of transmitting haptic data representative of a haptic effect for rendering of the haptic effect on body part(s) of a person by a haptic device. The present application also relates to a communication protocol between a haptic (rendering) engine and a haptic device comprising one or more haptic actuators.

BACKGROUND

The present section is intended to introduce the reader to various aspects of art, which may be related to various aspects of at least one exemplary embodiments of the present application that is described and/or claimed below. This discussion is believed to be helpful in providing the reader with background information to facilitate a better understanding of the various aspects of the present application.

Haptic technology broadly refers to any technology recreating the sense of touch in a user interface by applying force, vibration, motion and other feelings such as temperature, to provide information to an end user, for example in addition to visual and audio information when rendering multimedia contents.

Haptic feedback covers a wide range of possible stimulation embodiments but is mainly divided into tactile haptic technology and kinesthetic haptic technology: tactile haptic feedback (or tactile haptic effect) refers to sensations such as vibration, friction, or micro-deformation while kinesthetic haptic feedback (or kinesthetic haptic effect) refers to sensations that provide force sensations that can stimulate both mechanical stimuli as well as stimuli related to the position and the movement of the body.

The rendering of haptic feedback or haptic effect is obtained using haptic device (also called haptic rendering device), a haptic device corresponding to an arrangement of one or more haptic actuators. For example, vibrotactile effects might be obtained with the use of haptic devices such as ERMs (Eccentric Rotating Mass), LRAs (Linear Resonant Actuators), and large bandwidth actuators like VCM (Voice Coil Motors), or PZT (Piezoelectric Actuators). Kinesthetic effects might be rendered with actuators exercising a force impeding a limb movement, such effects being merely felt on the muscles and tendons than on the skin. Other examples of haptic devices comprise resistive force feedback devices, active force feedback devices and skin indentation devices.

There is a large range of haptic devices with various arrangements of the actuator(s) forming the haptic device. When aggregating haptic related data in a container to be transmitted to a haptic engine (also called haptic rendering engine) for rendering a haptic effect on a human body, it is generally not known the type of haptic rendering device that will be used to render the haptic effect on the human body, which may lead to erroneous rendering of the haptic effect by the haptic engine and associated haptic rendering device(s).

SUMMARY

The following section presents a simplified summary of at least one exemplary embodiment in order to provide a basic understanding of some aspects of the present application. This summary is not an extensive overview of an exemplary embodiment. It is not intended to identify key or critical elements of an embodiment. The following summary merely presents some aspects of at least one of the exemplary embodiments in a simplified form as a prelude to the more detailed description provided elsewhere in the document.

According to a first aspect of the present application, there is provided a method of transmitting haptic data representative of a haptic effect, the method comprising:

- obtaining haptic device data representative of haptic rendering capabilities of a haptic rendering device;
- determining the haptic data by processing received haptic data representative of the haptic effect according to the haptic device data to adapt a rendering of the haptic effect to the haptic rendering capabilities; and
- transmitting the haptic data.

In an exemplary embodiment, the received haptic data comprise a set of information comprising:

- targeted body part information representative of a targeted body part of a body model targeted by the haptic effect, and/or
- reference haptic device information representative of a reference haptic device intended to render the haptic effect, and/or
- rendering information representative of rendering parameters of the haptic effect, the processing comprising:

- comparing the haptic device data with the set of information; and
- adjusting the received haptic data according to a result of the comparing when the result is representative of at least a difference between the haptic device data and the set of information.

In an exemplary embodiment, the processing comprises:

- comparing the targeted body part information with first information comprised in the haptic device data and representative of a body part of the body model associated with the haptic rendering device; and
- adjusting the targeted body part information according to a result of the comparing when the result is representative of a difference between the first information and the targeted body part information.

In a further exemplary embodiment, the body model comprises a first plurality of body parts and a second plurality of groups of body parts, each group of the second plurality comprising at least a body part of the first plurality, the adjusting being according to the first information, the targeted body part information and relationship information representative of relationships between at least a part of the first plurality of body parts and at least a part of the second plurality of groups of body parts.

In another exemplary embodiment, the reference haptic device information comprises spatial distribution information representative of spatial distribution of a set of haptic actuators comprised in said reference haptic device in a determined multidimensional space and location information representative of a location in the determined multidimensional space, the processing comprising:

- comparing the spatial distribution information with second information comprised in the haptic device data and representative of spatial distribution of a set of haptic actuators comprised in the haptic rendering device in the determined multidimensional space;
- determining at least a haptic actuator in the set of haptic actuators of the haptic rendering device according to the spatial distribution information, the second information and the location information; and
- adjusting the reference haptic device information according to the at least a determined haptic actuator of the set of haptic actuators of the haptic rendering device.

In a further exemplary embodiment, the reference haptic device information further comprises a first distance information representative of a distance with respect to the location, the processing further comprising determining a second distance information according to the spatial distribution information and the second information, the adjusting comprising replacing the first distance information with the second distance information.

In an additional exemplary embodiment, the rendering parameters comprise rendering parameters representative of frequency, rendering parameters representative of amplitude and/or rendering parameters representative of phase, the processing comprising:

- comparing the rendering information with information representative of a type of the haptic rendering device;
- filtering at least a part of the rendering parameters according to a result of the comparing when the result is representative of at least a difference between rendering capabilities associated with the type and the rendering information.

In another exemplary embodiment, the rendering parameters comprise rendering parameters representative of an Application Program Interface call, the processing comprising:

- comparing the rendering information with information representative of an ability of the haptic rendering device to process Application Program Interface;
- transforming at least a part of the rendering parameters according to a result of the comparing when the result shows an inability of the haptic rendering device to process Application Program Interface, the transforming being according to information representative of a type of the haptic rendering device.

In an exemplary embodiment, the haptic device data comprises at least one of the following:

- first data representative of a number of body parts targeted by the haptic rendering device; and/or
- second data representative of an identifier of each of the body parts; and/or
- third data representative of a set of haptic perception modalities comprising at least a haptic perception modality; and/or
- fourth data representative of a number of haptic actuators of the haptic rendering device; and/or
- fifth data representative of a spatial distribution of the haptic actuators; and/or
- sixth data representative of whether the haptic actuators are all of a same type; and/or
- seventh data representative of a actuator type for each of the actuators; and/or
- eighth data representative of haptic rendering parameters for each of the actuators; and/or
- nineth data representative of an ability to process Application Program Interface; and/or
- tenth data representative of a format of the haptic device data.

In an exemplary embodiment, the third data is for each of the body parts and the fourth, fifth, sixth, seventh and eighth data is for each haptic perception modality of the set.

In a further exemplary embodiment, the haptic device data is received from the haptic rendering device.

According to a second aspect of the present application, there is provided an apparatus of transmitting haptic data representative of a haptic effect, wherein the apparatus comprises a memory associated with at least a processor configured to implement the method in accordance with the first aspect of the present application.

According to a third aspect of the present application, there is provided a computer program product including instructions which, when the program is executed by one or more processors, causes the one or more processors to carry out a method according to the first aspect of the present application.

According to a fourth aspect of the present application, there is provided a non-transitory storage medium carrying instructions of program code for executing a method according to the first aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

Figure 1:
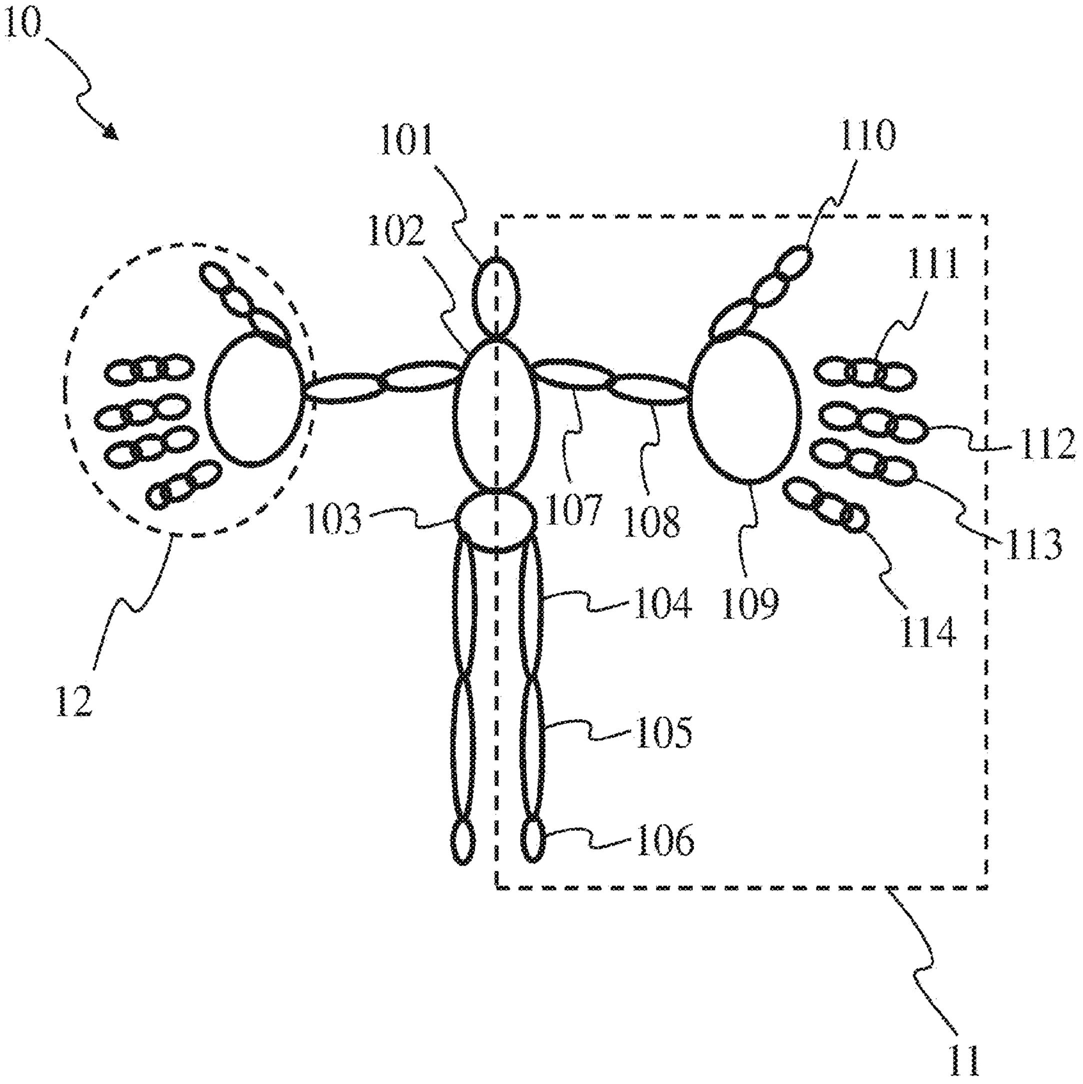
FIG. 1 shows a schematic representation of a body model, in accordance with at least one exemplary embodiment.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

At least one of the aspects generally relates to a method and apparatus of transmitting haptic data representative of a haptic effect for rendering the haptic effect by a haptic device receiving the haptic data, such a haptic device being called haptic rendering device in the following.

The haptic rendering device is configured to render a haptic effect from data describing the haptic effect received for example from a haptic engine. The haptic rendering device comprises a set of haptic actuators, which set comprises one or more haptic actuators. The haptic rendering device is associated with one or more body parts of a person, i.e., the haptic actuators of the haptic rendering device are arranged or located on this or these body parts in such a way that this or these body parts feel the haptic effect.

Haptic device data, which is representative of the haptic rendering capabilities of the haptic rendering device, is obtained, for example by the haptic engine. The haptic device data is for example retrieved from a memory, received from the haptic rendering device of from a remote device, e.g., a server or a computer.

The haptic data to be transmitted by the haptic engine to the haptic rendering device is determined or obtained by processing haptic data, which is for example received in a container by the haptic engine and which is representative of the haptic effect to be rendered on one or more body parts of the user, according to the haptic device data.

Such a processing enables to adapt, transform or adjust the rendering of the haptic effect described in the received haptic data to the haptic rendering capabilities of the haptic rendering device.

The haptic data resulting from the processing is transmitted to the haptic rendering device for rendering of the haptic effect on the person wearing or in contact with the haptic rendering device.

A container may for example correspond to a bitstream, a network packet or a file, e.g., a text file or a binary file.

Binary structures such as binary files (e.g., ISOBMFF files) are one instantiation of a container. Binary files define the syntax for parsing and understanding the structures of files. They have a start and an end and typically holds self-contained information. Binary files are generally transported and stored as a whole.

However, binary files may be further segmented into smaller file units, e.g., transport packets, for the purpose of transmission over a network such as using SCTP (Synchronous Collaboration Transport Protocol), IRTP (Interactive Real-Time Protocol), ETP (Efficient Transport Protocol), RTNP (Real Time Network Protocol) or RTP/I (Real Time application-level Protocol for distributed Interactive media).

FIG. 1 illustrates a schematic representation of a body model 10 in accordance with at least one exemplary embodiment.

The body model 10 of FIG. 1 represents a human body and is used for identifying various parts of the human body.

The body model 10 comprises a first set of body parts and a second set of groups of body parts.

Each body part of the first set belongs to one or more groups of the second set and each group of the second set comprises one or more body parts of the second set.

A body part of the first set may for example correspond to a group of the second set.

For example, the second set of groups of body parts comprises the following groups:

- a group called "Head" 101 and comprising the following body parts: Hand and Neck;
- a group called "Torso" 102 and comprising only one body part, the torso;
- a group called "Waist" 103 and comprising only one body part, the waist;
- a group called "Leg" and comprising the following body parts: Upper 104, Lower 105 and Foot 106;
- a group called "Arm" and comprising the following body parts: Upper 107, Lower 108 and Hand;
- a group called "Hand" 12 and comprising the following body parts: Palm 109 and Fingers;
- a group called "Fingers" and comprising the following body parts: Thumb 110, Index 111, Middle 112, Ring 113 and Pinky 114;
- a group called "Phalanx" and comprising the following body parts: First, Second and Third;
- a group called "Foot" and comprising the following body parts: Plant and Fingers;
- a group called "Down", corresponding to the lower part of the body model, and comprising the following body parts: Waist and Leg;
- a group called "Up", corresponding to the upper part of the body model 10, and comprising the following body parts: Head, Chest and Arm;
- a group called "Right", corresponding to the right half of the body model 10, and comprising the following body parts: Head, Chest, Waist, Right Arm and Right Leg;
- a group called "Left" 11, corresponding to the left half of the body model 10, and comprising the following body parts: Head, Chest, Waist, Left Arm and Left Leg;
- a group called "Front", corresponding to the front face of the body model 10, and comprising the following body parts: Front Head, Front Chest, Front Waist, Front Arm and Front Leg;
- a group called "Back", corresponding to the back face of the body model 10, and comprising the following body parts: Back Head, Back Chest, Back Waist, Back Arm and Back Leg; and
- a group called "All" corresponding to the whole body model 10 and gathering all groups and body parts, i.e.: Head, Chest, Waist, Arm and Leg.

Naturally, the groups and body parts forming the body model are not limited to the hereinabove example. The number of groups and the number of body parts are also not limited to the hereinabove example and may be any number.

Each group of body parts may be identified with an identifier corresponding for example to a syntax element, for example one of the following syntax elements: "All", "Left", "Right", "Front", "Back", "Up", "Down", "Head", "Torso", "Waist", "Leg", "Arm", "Hand", "Foot", "Fingers".

In a same way, each body part may be identifier with an identifier corresponding for example to a syntax element that may be identical to a syntax element identifying a group when the body part also corresponds to a group. For example, the following syntax elements may be used to identify a body part when needed: "Head", "Torso", "Waist", "Leg", "Arm", "Hand", "Foot", "Fingers", "Thumb", "Index", "Middle", "Ring", "Pinky", "Palm", "Plant", "Phalanx", "First", "Second", Third", "Upper", "Lower".

According to a variant, each body part and each group may be identified with an identifier corresponding to a value, for example a binary value or a hexadecimal value.

The identifier(s) of one or more groups is (are) used for signaling, i.e., indicating, in a container, which body part(s) is (are) targeted by a haptic effect. When necessary, the identifier(s) of the targeted body part(s) is (are) used in addition to the identifier(s) of the one or more groups to signal the targeted body part(s).

To signal one or more body parts (called targeted body part) in a container comprising information to be transmitted for example from a transmitter to a receiver, from a haptic data generator to a haptic rendering engine or from an encoder to a decoder, data identifying the targeted body part with reference to the groups comprising the targeted body part is written or encoded into the container.

For example, according to the example where the targeted body part corresponds to the third phalanx of each finger for both hands, data used to signal the information may correspond to: "Hand Third Phalanx".

According to another example, to signal the 3 phalanxes of the thumb of left hand, data used to signal the information may correspond to: "Left Hand Thumb".

According to another example, to identify the third phalanx of the thumb of the right hand, first data used to signal this information may correspond to:

"Right Hand Thumb Third" or "Right Hand Thumb Phalanx Third" depending on how body parts are grouped in the body model.

The use of groups of body parts, taking advantage of the symmetry of the body model 10 (Right/Left and Front/Back) enables to identify clearly and unambiguously each body part of the body model that may be targeted by a haptic effect.

Moreover, the use of groups of body parts enable to encode or signal efficiently the information identifying the targeted body part, especially when the targeted body part encompasses a plurality of body parts of the same type (e.g., phalanxes, both hands, same parts of the legs), the amount of data used to encode or signal the information being reduced.

According to a specific embodiment, the signaling of a targeted body part localized on a specific side of the body model, i.e., on the left-hand side or on the right-hand side, is obtained by writing into the container data identifying the side, i.e., Left or Right by referring to the groups of body parts "Left" and "Right".

According to a further specific embodiment, the signaling of a targeted body part localized on a specific face of the body model, i.e., on the front face or on the back (or rear) face, is obtained by writing into the container data identifying the face, i.e., Front or Back by referring to the groups of body parts "Front" and "Back".

According to a further specific embodiment, the data used to signal the targeted body part (or to encode the data identifying the targeted body part) comprises a first identifier (for example the syntax element describing the targeted body part) identifying the targeted body part and a second identifier identifying the one or more groups comprising the targeted body part (for example the syntax element(s) describing the one or more groups comprising the targeted body part).

According to another specific embodiment, the data used to signal the targeted body part comprises a third identifier identifying a logical operator. The logical operator corresponds for example to:

- the logical operator NOT; and/or
- the logical operator AND; and/or
- the logical operator OR; and/or
- the logical operator XOR; and/or
- the logical operator NOR.

For example, the upper and lower parts of an arm or both arms may be signaled and/or encoded into the container with the following data: "Left Arm NOT Hand" or the left arm, and "Arm NOT Hand" for both arms.

The use of the logical operator NOT enables to exclude one or more body parts of a group. The exclusion is signaled using the identifier of the logical operator NOT and the identifier of the excluded body part. In the abovementioned example, the body part or group "Hand" is excluded from the group "Arm" to signal and/or encode the identification of lower and upper parts of an arm.

Another way to signal the information would be: "Arm Upper AND Lower".

The use of a logical operator may be more efficient than identifying each targeted body part individually. For example, to identify all the hand but the first phalanx of each finger, the following first data may be used to signal and/or encode the information into the container: "Hand NOT First Phalanx".

The different embodiments described hereinabove may be combined with each other according to any combination.

Figure 2:
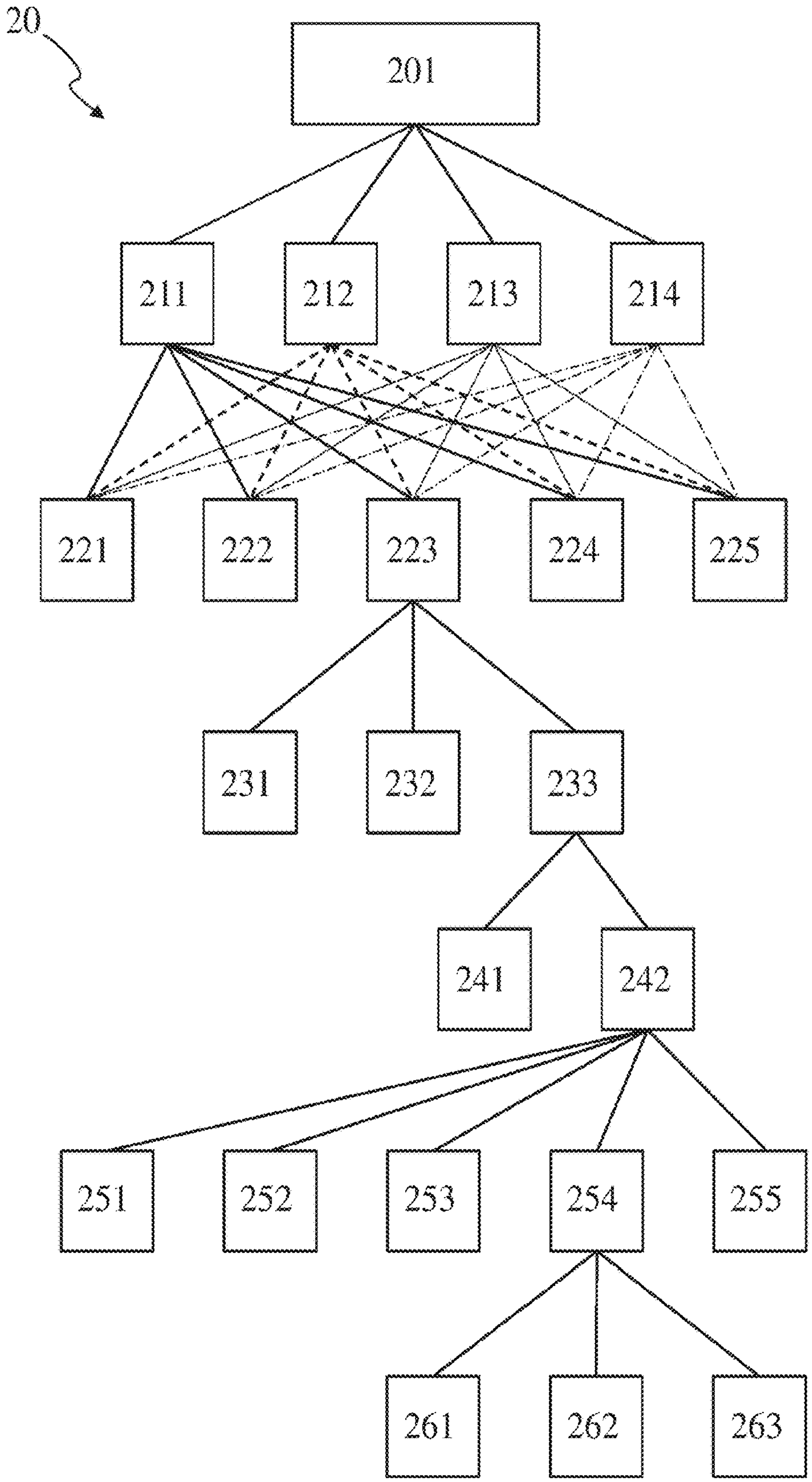
FIG. 2 shows a schematic hierarchical representation of the body model of FIG. 1, in accordance with at least one exemplary embodiment.

FIG. 2 illustrates a schematic representation 20 of relationships between groups and body parts of the body model 10 in accordance with at least one exemplary embodiment.

FIG. 2 shows a part of the groups and body parts of the body model 10 and the connections or links between groups and/or body parts. FIG. 2 shows in a hierarchical way the association and dependency between groups and body parts.

A group (e.g., a group 'A') or a body part is said dependent from or belonging to another group (e.g., a group 'B') when said group (e.g., said group 'A') or said body part is comprised in said another group (e.g., said group 'B'). The belonging of a group or of a body part to another group is shown on FIG. 2 in a hierarchical way with lines that interconnects two boxes belonging to two different layers (a layer corresponding to a hierarchical level).

For example, the box referenced 201 corresponds to the group "All" and belongs to the highest hierarchical level (e.g., level 0) of the structure or tree 20.

Four boxes 211, 212, 213, 214 form a layer having a hierarchical level (e.g., level 1) that is directly inferior to level 0. Box 211 represents for example the group "Left", box 212 represents the group "Right", box 213 represents the group "Front" and box 214 represents the group "Back". Each of the group "Left", "Right", "Front" and "Back" belongs to the group "All", or said differently, the group "All" comprises the groups "Left", "Right", "Front" and "Back".

As it appears in the structure or tree 20, each of the groups "Left", "Right", "Front" and "Back" then comprises the groups represented by boxes referenced 221, 222, 223, 224 and 225. Boxes 221, 222, 223, 224 and 225 form a layer having a hierarchical level (e.g., level 2) that is directly inferior to level 1.

Box 221 represents for example the group "Head", box 222 represents for example the group "Chest", box 223 represents for example the group "Arm", box 224 represents for example the group "Leg" and box 225 represents for example the group "Waist".

In a layer having a hierarchical level (e.g., level 3) directly inferior to level 2, 3 boxes 231, 232, 233 are connected to (and dependent from) box 223. The boxes 231 to 233 represent the groups and/or body parts comprised in the group "Arm" 223. Box 231 represents for example the body part "Upper", box 232 represents for example the body part "Lower" and box 233 represents for example the group "Hand" that may also correspond to a body part.

In a layer having a hierarchical level (e.g., level 4) directly inferior to level 3, 2 boxes 241 and 242 are connected to (and dependent from) box 233. The boxes 241 and 242 represent the groups and body parts comprised in the group "Hand" 233. Box 241 represents for example the body part "Palm" and box 242 represents for example the group "Fingers".

In a layer having a hierarchical level (e.g., level 5) directly inferior to level 4, 5 boxes 251, 252, 253, 254 and 255 are connected to (and dependent from) box 242. The boxes 251 to 255 represent the groups comprised in the group "Fingers" 242. Box 251 represents for example the group "Thumb" (that may also correspond to a body part according to a variant), box 252 represents for example the group "Index" (that may also correspond to a body part according to a variant), box 253 represents for example the group "Middle" (that may also correspond to a body part according to a variant), box 254 represents for example the group "Ring" (that may also correspond to a body part according to a variant) and box 255 represents for example the group "Pinky" (that may also correspond to a body part according to a variant).

When the boxes 251 to 255 represent a group, i.e., the groups "Thumb", "Index", "Middle", "Ring" and "Pinky", the structure or tree 20 comprises an additional layer having a hierarchical level (e.g., level 6) directly inferior to level 5 that comprises boxes 261, 262 and 263, which are connected to (and dependent from) each box 251 to 255. For clarity reasons, only the connections between boxes 261 to 263 on one hand and box 254 on the other hand are shown on FIG. 2.

Box 261 represents for example the body part "First Phalanx", box 262 represents for example the body part "Second Phalanx" and box 263 represents for example the body part "Third Phalanx".

According to a variant, the body parts "First Phalanx", "Second Phalanx" and "Third Phalanx" are grouped in a group "Phalanx", the group "Phalanx" being connected to (or dependent from) each group "Fingers" 251 to 255 and the body parts "First Phalanx", "Second Phalanx" and "Third Phalanx" being connected to (or dependent from) the group "Phalanx".

Figure 3:
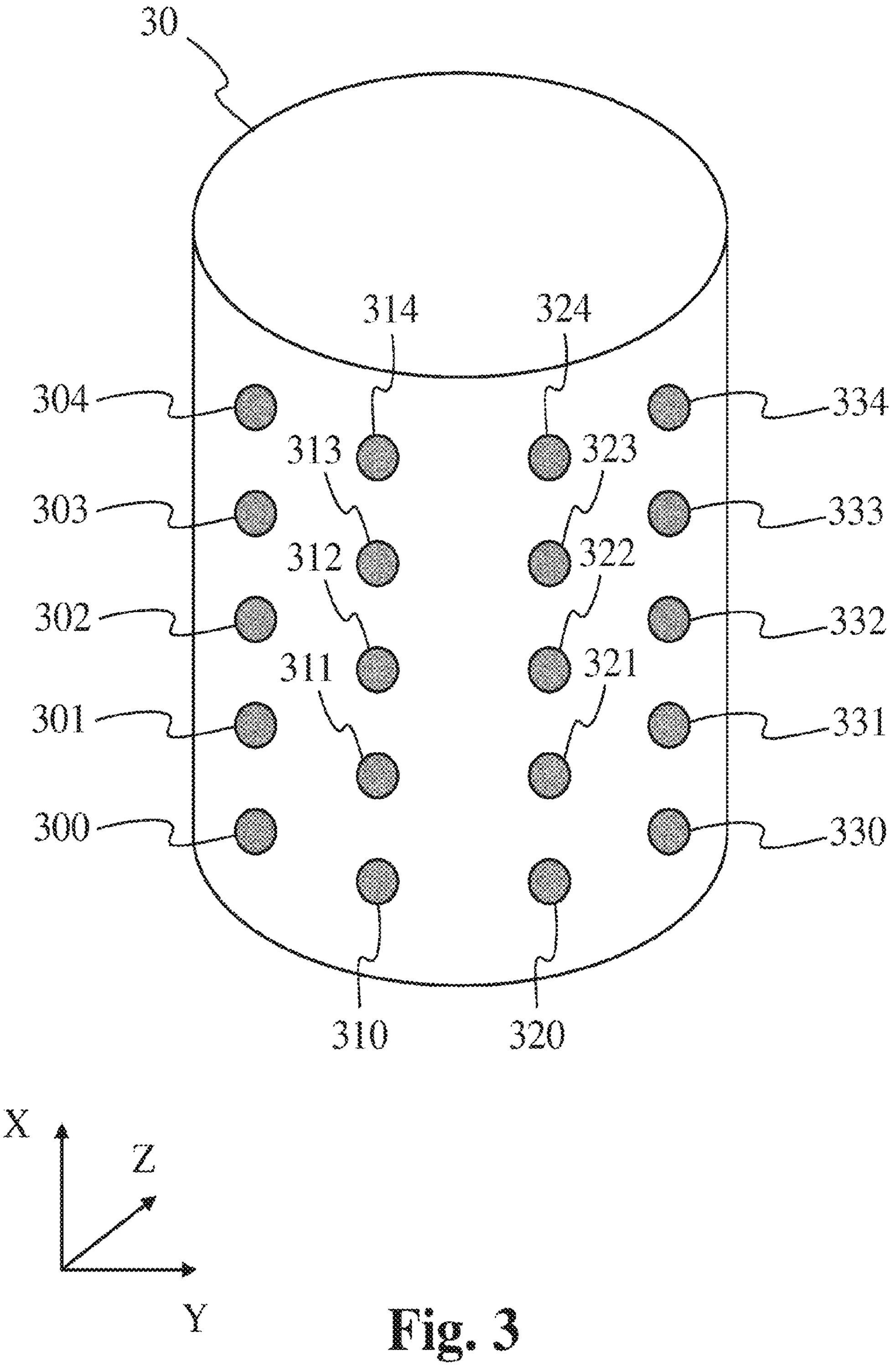
FIG. 3 shows a schematic representation of the spatial arrangement of haptic actuators of a haptic device in a determined multidimensional space, in accordance with at least one exemplary embodiment.

FIG. 3 illustrates a schematic representation of the arrangement of a set of actuators of a haptic device on a body part 3 in a determined multidimensional space, in accordance with at least one exemplary embodiment.

The body part 3 corresponds to an element of a body model, for example the body model 10 of FIG. 1.

The body part 3 is represented with a cylinder on FIG. 3, only the front face of the cylinder being visible. Naturally, the form of the body part is not limited to a cylinder but may be any form.

The haptic device associated with the body part comprises 40 haptic actuators according to the non-limitative example of FIG. 1, only 20 haptic actuators 300 to 304, 310 to 314, 320 to 324 and 330 to 334 being visible on FIG. 3.

20 haptic actuators of the haptic device of FIG. 3 are associated with the front face of the body part 3 and 20 haptic actuators (not represented) of the haptic device are associated with the back (or rear) face of the body part 3.

According to the example of FIG. 3, the spatial distribution of the haptic actuators is signaled into the container (that is intended to be transmitted to a decoder and/or haptic (rendering) engine) with respect to a cartesian 3D space (X, Y, Z), that may for example be associated with the body part 3 or with the body model the body part 1 belongs to. According to this example, the haptic device signaled in the container to be transmitted to the haptic engine may be called reference haptic device as it corresponds to the haptic device that is intended or sought to render the haptic effect. The reference haptic device may be different from the haptic rendering device really used to render the haptic effect on the person wearing the haptic rendering device.

The spatial distribution is for example signaled under the form of a vector (represented with $[N_x,N_y,N_z]$) with:

- a first information (first element '$N_x$' of the vector) representing a number of haptic actuators according to the first dimension (according to the X-axis, which represents for example the longitudinal axis) of the 3D space; $N_x$ may be seen as the resolution of the haptic actuators according to the first dimension, i.e., the number of haptic actuators per haptic device according to the first dimension;
- a second information (second element '$N_y$' of the vector) representing a number of haptic actuators according to the second dimension (according to the Y-axis, which represents for example the transversal axis) of the 3D space; $N_y$ may be seen as the resolution of the haptic actuators according to the second dimension, i.e., the number of haptic actuators per haptic device according to the second dimension; and
- a third information (third element '$N_z$' of the vector) representing a number of haptic actuators according to the third dimension (according to the Z-axis, which represents for example the depth axis) of the 3D space; $N_z$ may be seen as the resolution of the haptic actuators according to the third dimension, i.e., the number of haptic actuators per haptic device according to the third.

An information representative of the maximal resolution of the reference haptic device (i.e., the total amount of haptic actuators per haptic device) may be obtained from the second data with: $N_x*N_y*N_z$.

The spatial distribution of the haptic actuators of the reference haptic device may be signaled or encoded as follows: [5,4,2] with 5 haptic actuators according to the X axis, 4 haptic actuators according to the Y axis and 2 haptic actuators according to the Z axis for a total amount of 40 haptic actuators (5*4*2).

For each face of the body part, the haptic actuators are arranged according to 4 columns and 5 lines.

The first column (on the left-hand side) comprises 5 haptic actuators 300, 301, 302, 303 and 304. The second column, on the right of the first column, comprises 5 haptic actuators 310, 311, 312, 313 and 314. The third column, on the right of the second column, comprises 5 haptic actuators 320, 321, 322, 323 and 324. The fourth column, on the right of the third column, comprises 5 haptic actuators 330, 331, 332, 333 and 334.

The haptic actuators are arranged according to a matrix on each side of the body parts, the matrix comprising 5 lines and 4 columns.

According to another example, the spatial distribution for a haptic device comprising a single actuator is signaled or encoded with: [1,1,1].

According to a specific and non-limiting embodiment, the third element '$N_z$' of the vector [$N_x$, $N_y$, $N_z$] is less or equal to 2, i.e., $N_z$=1 or $N_z$=2. According to this embodiment, the maximal number of layers of actuators according to the Z axis (depth) is equal to 2, with a first layer corresponding to the front face and a second layer corresponding to the back face of the body part (or of the haptic device).

The signaling/encoding of the spatial distribution as explained hereinabove enables for example a decoder and/or haptic (rendering) engine receiving the container to obtain information about the reference haptic device enabling the identification of the reference haptic device, through its specific spatial distribution of haptic actuator(s).

In addition, the signaling/encoding of the spatial distribution as explained hereinabove enables the decoder and/or haptic (rendering) engine receiving the container to adapt a haptic effect to be rendered by the haptic rendering device (used by the person onto whom the haptic effect is to be rendered that may be different from the reference haptic device) to the specific spatial distribution of haptic actuator(s) signaled in the container.

According to a particular embodiment, third data representative of a specific location in the 3D space is added into the container in addition to the second data.

According to a first example, the specific location is representative of the position of a specific haptic actuator of the set of haptic actuators of the reference haptic device.

According to a second example, the specific location is representative of a point, for example a point between 2 haptic actuators of the set of haptic actuators of the reference haptic device.

The addition of third data is for example added into the container when the haptic device comprises a plurality of actuators (e.g., when the spatial distribution being signaled/encoded with data different from [1,1,1]) and/or when only a part of the haptic actuators of the (reference) haptic device is intended to be used to render the haptic effect.

According to the first example, the location or position of the specific haptic actuator is for example signaled or encoded under the form of a vector (represented with [$C_x$,$C_y$,$C_z$]) with:

- a first information (first element '$C_x$' of the vector) representing the index of the line/row the specific haptic actuator belongs to, i.e., according to the first dimension (according to the X-axis) of the 3D space;
- a second information (second element '$C_y$' of the vector) representing the index of the column the specific haptic actuator belongs to, i.e., according to the second dimension (according to the Y-axis) of the 3D space; and
- a third information (third element '$C_z$' of the vector) representing the index of the face (front or back) the haptic actuator belongs to, i.e., according to the third dimension (according to the Z-axis) of the 3D space.

For example, for identifying the haptic actuator referenced 323 on FIG. 3, the third information corresponds to: [3,2,0]; for identifying the haptic actuator referenced 311 on FIG. 3, the third information corresponds to: [1,1,0]; and for identifying the haptic actuator located at the same position as the haptic actuator but on the back/rear face, the third information corresponds to: [3,2,1].

Therefore, the signaling of the spatial distribution of the reference haptic device with the identifying of a specific haptic actuator (e.g., haptic actuator 323), the signaling/encoding of the information corresponds to: [5,4,2] [3,2,0].

According to the second example, the location of the point is for example signaled or encoded under the form of a vector (represented with [$C_x$, $C_y$, $C_z$]) with:

- a first information (first element '$C_x$' of the vector) representing a float value corresponding to the position of the point according to the first dimension (according to the X-axis) of the 3D space; the first information is for example comprised between the minimal index of the lines/rows and the maximal index of the lines/rows;
- a second information (second element '$C_y$' of the vector) representing a float value corresponding to the position of the point according to the second dimension (according to the Y-axis) of the 3D space; the second information is for example comprised between the minimal index of the columns and the maximal index of the columns; and
- a third information (third element '$C_z$' of the vector) representing a float value corresponding to the position of the point according to the third dimension (according to the Z-axis) of the 3D space; the third information is for example comprised between 0 and 1.

According to another particular embodiment, fourth data representative of a distance with respect to the specific location (i.e., the specific haptic actuator or the point between 2 haptic actuators) identified through the third data is added into the container in addition to the third data. The distance is defined in the 3D space.

The addition of a distance enables to identify a group of haptic actuators in the set of haptic actuators forming the reference haptic device, for example when the haptic effect is to be rendered by the group of haptic actuators.

The addition of the fourth data enable to optimize the encoding of the information by minimizing the amount of data used to signal/encode this information. The use of a distance expressed in the 3D space is more efficient than identifying separately each haptic actuator of the group via third data as explained hereinabove for the specific haptic actuator.

The distance with regard to the specific haptic actuator is for example signaled or encoded under the form of a vector (represented with [$R_x$, $R_y$, $R_z$]) with:

- a first information (first element '$R_x$' of the vector) representing a number of selected haptic actuators departing from the location of the specific haptic actuator or point according to the first dimension (according to the X-axis) of the 3D space;
- a second information (second element '$R_y$' of the vector) representing a number of selected haptic actuators departing from the location of the specific haptic actuator or point according to the second dimension (according to the Y-axis) of the 3D space; and
- a third information (third element '$R_z$' of the vector) representing a number of selected haptic actuators departing from the location of the specific haptic actuator or point according to the third dimension (according to the Z-axis) of the 3D space.

For example, to identify a group of haptic actuators comprising the haptic actuators 322, 323 and 324 by using the third information identifying the specific haptic actuators 323, the distance may be signaled or encoded with: [1,0,0].

Thus, if [$C_x$, $C_y$, $C_z$] corresponds to the third data identifying the position of the specific haptic actuators and [$R_x$, $R_y$, $R_z$] corresponds to the fourth data defining the distance, the group of haptic actuators defined for rendering the haptic effect will comprise each haptic actuators having a position $[P_x, P_y, P_z]$ verifying:

$$C_x - R_x \le P_x \le C_x + R_x; \text{ and}$$

$$C_y - R_y \le P_y \le C_y + R_y; \text{ and}$$

$$C_z - R_z \le P_z \le C_z + R_z$$

According to a further embodiment, data representative of a haptic animation is signaled and/or encoded into the container.

A haptic animation corresponds to a haptic effect, or a sequence of haptic effects, rendered via a plurality of haptic actuators according to a path. The path is for example defined with a starting or initial point and with an ending or final point.

A haptic animation may correspond to a haptic effect or to a sequence of haptic effects spreading across one or more parts of the body of the user receiving this (these) haptic effect(s) and rendered through a sequence of haptic actuators arranged onto the one or more part of the user's body.

The starting point corresponds for example to a first specific haptic actuator or to a first group of haptic actuators. The ending point corresponds for example to a second specific haptic actuator or to a second group of haptic actuators. The first haptic actuator and the second haptic actuator belong for example to a same haptic device or to two different haptic devices.

The first specific haptic actuator (or first group of haptic devices) is advantageously signaled into the container as explained hereinabove, using the second data and optionally the third and fourth data.

The second specific haptic actuator (or second group of haptic devices) is advantageously signaled into the container as explained hereinabove, using the second data and optionally the third and fourth data.

The haptic (rendering) engine receiving the container parses the data comprised into the container to read the data representative of the haptic animation, specifically the data representative of the starting and ending points, i.e., the first and second haptic actuator.

From the first and second haptic actuators, the haptic (rendering) engine determines or computes a path of haptic actuators, starting with the first haptic actuator and ending with the second haptic actuator. The path comprises a plurality of haptic actuators, belonging to one or several haptic devices arranged on different parts of the body of the user receiving the haptic effect.

The path is further determined according to the haptic effect to be rendered, for example according to the duration of the haptic effect, according to the amplitude of the haptic effect at the starting point and to the amplitude of the haptic effect at the ending point.

The multidimensional space used to define the data representative of the targeted haptic device is not limited to the example of FIG. 3, i.e., the 3D space (X,Y,Z) but extends to any multidimensional space, e.g., a 2D space (θ, Y), for example a 2D multidimensional space corresponding to a polar 2D space.

According to a specific embodiment, the spatial distribution of the reference haptic device is defined or represented with data representative of active areas in a set of areas, each active area comprising one or more haptic actuators.

According to this embodiment, the haptic (rendering) engine receives from the reference haptic device following data to describe the spatial distribution of haptic actuators of the reference haptic device:

- Data representative of a set of areas for the reference haptic device: the data is for example representative of a matrix with 'N1' (N1 being an integer) areas or cells, the matrix being defined with 'C1' (C1 being an integer) columns and 'R1' (R1 being an integer) rows, N1 being equal to C1*R1; and
- Data identifying which area(s) or cell(s) of the matrix that comprise haptic actuators, an area or cell that comprises one or more haptic actuators being called an active area or an active cell.

The number of haptic actuator(s) per each active area is for example not defined in the container received by the haptic (rendering) engine. According to this example, each element 300, 301, 302, 303 and 304, 310, 311, 312, 313 and 314, 320, 321, 322, 323 and 324, and 330, 331, 332, 333 and 334 illustrated on FIG. 3 may correspond to an active area and represents a single haptic actuator or a group of haptic actuators, the number of haptic actuator(s) per active area being not comprised in the container and not known by the haptic (rendering) engine.

According to a variant, the number of haptic actuator(s) per each active area is defined in the container received by the haptic (rendering) engine, this information being encoded with the data representative of the spatial distribution of the haptic actuators.

When only a part of the active areas of the reference haptic device is intended to be used to render the haptic effect, data representative of the active areas targeted to render the haptic effect is encoded and/or signaled into the container to be transmitted to the haptic (rendering) engine, each active area being for example identified with an index of the column and an index of the row comprising the active area.

Figure 4:
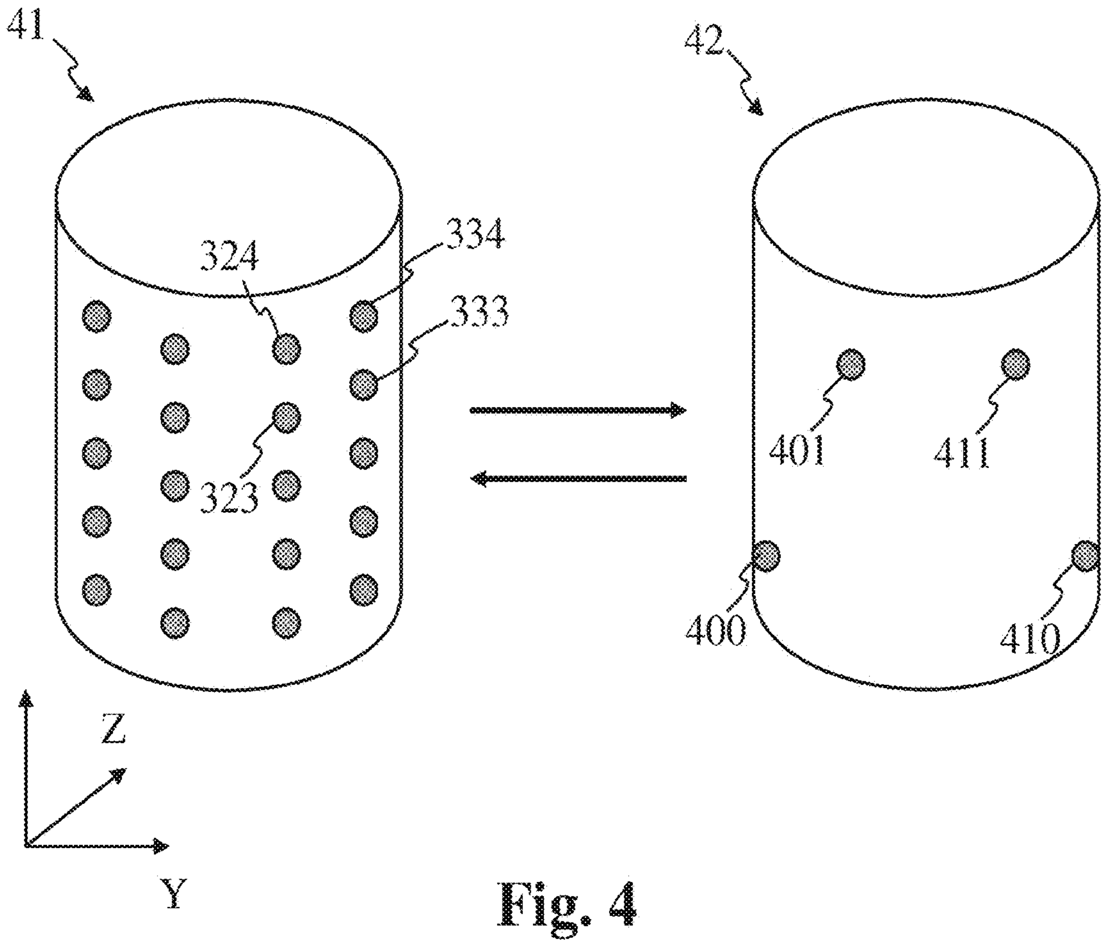
FIG. 4 shows a conversion from the spatial arrangement of FIG. 3 to a spatial arrangement of another haptic device, in accordance with at least one exemplary embodiment.

FIG. 4 illustrates a schematic representation of a conversion of data representative of the spatial distribution of haptic actuators of a first haptic device to data representative of the spatial distribution of haptic actuators of a second haptic device, in accordance with at least one exemplary embodiment.

FIG. 4 shows, on the left-hand side, the spatial distribution 41 of haptic actuators of a first haptic device and, on the right-hand side, the spatial distribution 42 of haptic actuators of a second haptic device that is different from the first haptic device.

The first haptic device corresponds for example to a reference haptic device, the data representative of this reference haptic device being signaled or encoded into a container transmitted to a haptic (rendering) engine. The second haptic device corresponds for example to a haptic rendering device, i.e., a haptic device that is implemented on user-side for rendering the haptic effect that is described with data comprised in the container received by the haptic (rendering) engine.

According to the on-limitative example of FIG. 4, the haptic actuators of the first haptic device and of the second haptic device are associated with or arranged on a same body part.

The spatial distribution 41 of the first haptic device is for example defined in the 3D space with the following second data: $[N1_x, N1_y, N1_z]$.

The spatial distribution 42 of the second haptic device is for example defined in the 3D space with the following second data: $[N2_x, N2_y, N2_z]$.

The first haptic device corresponds for example to the haptic device described with regard to FIG. 3, which comprises 40 haptic actuators with a spatial distribution defined with [5,4,2].

The second haptic device comprises for example 6 haptic actuators, with 2 haptic actuators 401, 411 being arranged on the upper part of the front face, 2 haptic actuators (not represented on FIG. 4) being arranged on the upper part of the back face and 2 haptic actuators 400, 410 located on the sides of the body part.

The second haptic device comprises 6 haptic actuators with a spatial distribution defined with [2,2,2].

A container received by the haptic (rendering) engine or a decoder may comprise following data or information:

first data representative of the spatial distribution of the first haptic device, i.e., $[N1_x,N1_y,N1_z]$;

second data representative of a determined location (i.e., a specific haptic actuator of the set of haptic actuators or of the first haptic device or a point in the 3D space), i.e., $[C1_x,C1_y,C1_z]$; and third data representative of a distance, i.e., $[R1_x,R1_y, R1_z]$.

When the second haptic device associated with the haptic rendering engine to render the haptic effect is different from the first haptic device signaled into the container, the haptic rendering engine converts the second and third data to determine which haptic actuator(s) of the second haptic device correspond to the haptic actuators of the first haptic device identified with the second and third data.

To reach that aim, the haptic rendering engine converts the second and third data comprised in the container in corresponding data representative of a determined haptic actuator (noted $[C2_x, C2_y, C2_z]$) of the second haptic device and data representative of a distance (noted $[R1_x,R1_y, R1_z]$) for the second haptic device.

The parameters $C2_x$, $C2_y$ and $C2_z$ are for example obtained through the following equations, the haptic rendering engine knowing $N2_x$, $N2_y$ and $N2_z$ (these parameters being for example stored in a memory of the haptic rendering engine or retrieved from the second haptic device that is connected to the haptic (rendering) engine) and the haptic (rendering) engine retrieving from the received container $N1_x$, $N1_y$ and $N1_z$, $C1_x$, $C1_y$ and $C1_z$, and $R1_x$, $R1_y$ and $R1_z$:

$$C2_x = \left(\frac{(C1_x + 1)N2_x}{N1_x} - 1\right) \quad \text{Equation 1}$$

$$C2_y = \left(\frac{(C1_y + 1)N2_y}{N1_y} - 1\right) \quad \text{Equation 2}$$

$$C2_z = \left(\frac{(C1_z + 1)N2_z}{N1_z} - 1\right) \quad \text{Equation 3}$$

$$R2_x = \frac{N2_x}{N1_x} \cdot R1_x - 1 \quad \text{Equation 4}$$

$$R2_y = \frac{N2_y}{N1_y} \cdot R1_y - 1 \quad \text{Equation 5}$$

$$R2_z = \frac{N2_z}{N1_z} \cdot R1_z - 1 \quad \text{Equation 6}$$

Applying the Equations 1 to 6 to the non-limiting example of FIG. 4 with $[N1_x,N1_y,N1_z]=[5,4,2]$, $[C1_x,C1_y,C1_z]=[3,2,0]$ (haptic actuator 123), $[R1_x,R1_y, R1_z]=[1,1,0]$ and $[N2_x, N2_y,N2_z]=[2,2,2]$, it is obtained: $[C2_x,C2_y,C2_z]=[1,1,0]$ (haptic actuator 311) and $[R2_x,R2_y,R2_z]=[0,0,0]$.

The equations 1 to 6 are for example stored in a memory of the haptic (rendering) engine. According to a variant, the equations 1 to 6 are encoded into the contained and transmitted with the data representative of the first haptic device.

Naturally, the equations used for computing the conversion depend on the multidimensional space used to represent the data.

According to a specific embodiment, the spatial distribution 42 of the second haptic device is defined or represented with data representative of active areas in a set of areas, each active area comprising one or more haptic actuators.

According to this embodiment, the haptic (rendering) engine receives from the second haptic device following data to describe the spatial distribution 42 of haptic actuators:

Data representative of a set of areas associated with the body part the second haptic device is associated with: the data is for example representative of a matrix with 'N2' (N2 being an integer) areas or cells, the matrix being defined with 'C2' (C being an integer) columns and 'R2' (R2 being an integer) rows, N2 being equal to C2*R2; and Data identifying which area(s) or cell(s) of the matrix that comprise haptic actuators, an area or cell that comprises one or more haptic actuators being called an active area or an active cell.

The number of haptic actuator(s) per each active area is for example not defined in the container received by the haptic (rendering) engine. According to this example, each element 400, 401, 410 and 411 illustrated on FIG. 4 corresponds to an active area and represents a single haptic actuator or a group of haptic actuators, the number of haptic actuator(s) per active area being not comprised in the container and not known by the haptic (rendering) engine.

According to a variant, the number of haptic actuator(s) per each active area is defined in the container received by the haptic (rendering) engine, this information being encoded with the data representative of the spatial distribution of the haptic actuators.

According to this embodiment, the haptic (rendering) engine compares or maps the first, second and/or third data representative of the first haptic device onto the matrix (or the data identifying the active area(s) of the first rendering device that is/are intended to render the haptic effect) and active area(s) representing the spatial distribution of the haptic actuators of the second haptic device to determine which active area(s) of the second haptic device correspond to the haptic actuators of the first haptic device identified with the second and third data.

Figure 5:
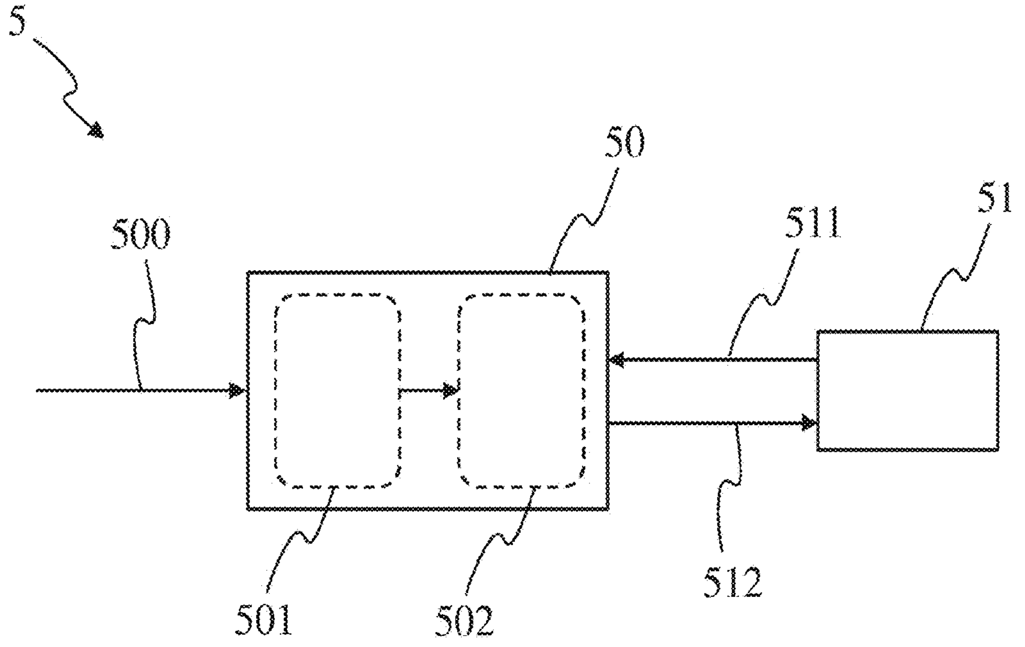
FIG. 5 shows an example of a communication scheme of haptic related data, in accordance with at least one exemplary embodiment.

FIG. 5 shows schematically a communication scheme 5 of haptic related data, according to a particular embodiment of the present principles.

FIG. 5 shows a communication system and operations of a communication method implemented by such a system.

FIG. 5 shows a haptic (rendering) engine 50 coupled in communication with a haptic rendering device 51. The haptic (rendering) engine 50 is for example connected with the haptic rendering device 51 via a wired or wireless connection.

The haptic rendering device 51 is for example connected to the haptic (rendering) engine 50 through USB input terminal, a phone connector (also known as phone jack, audio jack, headphone jack or jack plug) input terminal or an HDMI input terminal.

According to another example, the haptic rendering device 51 is connected to the haptic (rendering) engine 50 using Wifi® or Bluetooth® communication interfaces.

Data exchange between the haptic rendering device 51 and the haptic (rendering) engine 50 may be performed in the framework of a protocol communication, data being exchanged by way of APIs (Application Program Interface) implemented on both sides of the system 5, i.e., in the haptic (rendering) engine 50 and in the haptic rendering device 51.

The haptic (rendering) engine 50 is advantageously configured to receive haptic data 500 from a remote device, e.g., a server of the cloud, a computer, an encoder, a haptic data generator, for example through a LAN or WLAN network.

The haptic data 500 is for example signaled and/or encoded into a container under the form of encoded data, the container corresponding for example to a file, a bitstream, data packets, data frame(s).

The received haptic data 500 may for example comprise data representative of the haptic effect to be rendered by a haptic device, for example:

- the type of the haptic (and/or sensorial) effect (e.g., vibrotactile effects, force effects, stiffness effects, texture effects, temperature effects, wind effects, pain effects, olfactive effects, light-based effects, etc.); and/or
- the amplitude, phase and/or frequency of signal(s) representing the haptic effect; and/or
- the starting time of the haptic effect; and/or
- the duration of the haptic effect; and/or
- an identifier of the haptic effect that is usable by the system receiving the data to retrieve, for example from a memory of the system, parameters of the haptic effect; and/or
- information representative of one or more body parts that is/are targeted by haptic effect described in the received haptic data, such information being called targeted body part information; and/or
- information representative of a reference haptic device that is foreseen to render the haptic effect on the user body, such information being called reference haptic device information.

The targeted body part information is for example defined in the received haptic data using the syntax described with reference to FIGS. 1 and 2 for the body model 10, i.e., a targeted body part may be defined by referring to one or more groups of body parts the targeted body part belongs to.

According to a variant, targeted body part information corresponds for example to a unique identifier per targeted body part, the haptic (rendering) engine retrieving the information about the targeted body part(s) from a LUT (Look-Up Table) stored in a memory of the haptic engine and from the identifier(s) contained in the received haptic data 500. The body model may for example be represented with a skeleton of joints and segments, a mesh or with body parts and groups of body parts comprising one or more body parts and each identified with a specific identifier.

The reference haptic device information may for example comprise the spatial distribution information about the haptic actuators forming the reference haptic device, as described in reference to FIG. 3.

According to a variant, the reference haptic device information may further comprise:

- information identifying a location (i.e., a specific haptic actuator or a point between 2 haptic actuators), as described in reference to FIG. 3; and optionally
- information representative of a distance when more than one haptic actuator is foreseen to render the haptic effect.

According to another variant, the reference haptic device information may further comprise information identifying one or more active areas (each active area comprising one or more haptic actuators).

The container 500 is received by a module that implements a parsing and/or decoding process 501 to parse, read and/or decode the encoded data comprised in the container 500 to obtain decoded haptic data. The module 501 implementing the parsing/decoding process may be hardware, software or a combination of hardware and software.

The haptic (rendering) engine 50 is further advantageously configured to obtain the haptic device data 511 representative of the haptic rendering capabilities of the haptic rendering device 51.

The haptic device data 511 is for example received automatically from the haptic rendering device 51 when connecting the haptic rendering device 51 to the haptic engine 50, e.g., via USB.

When connecting the haptic rendering device 51 to the haptic engine 50, haptic rendering device 51 automatically initiates a process for transmitting the haptic device data through dedicated API(s). This process corresponds for example to a so-called "plug and play" (PnP) process, the haptic rendering device 51 and the haptic engine 50 corresponding to PnP devices.

According to another example, the haptic device data is obtained or retrieved from a memory of the haptic engine 50 or from a remote system, for example upon reception of an identifier identifying the haptic rendering device 51, said identifier being for example automatically transmitted by the haptic rendering device 51 to the haptic engine 50 or transmitted by the haptic rendering device 51 after transmission of a request by the haptic engine 50.

The haptic device data comprise for example at least part of the following information and/or data:

- information and/or data representative of the haptic device name and/or of an identifier of the haptic device 51: such an information may for example correspond to a string of characters, e.g., "chair", "palm rest" or "XR headset"; and/or
- information and/or data representative of the manufacturer of the haptic device, for example under the form of a string; and/or
- information and/or data representative of a version of the haptic device: such an information may for example correspond to a string of characters, e.g., "1.1"; and/or
- information and/or data representative of the number of body parts associated with the haptic device 51 or targeted by the haptic device 51: such an information may for example correspond to an integer; and/or
- information and/or data representative of the name or identifier of each body part associated with or targeted by the haptic device: such an information may for example correspond to a list or strings or to a list of integer, the body part(s) being for example identified according to the same naming rules used to target one or more body parts in the haptic data 500 (for example using the syntax described with regard to FIGS. 1 and 2); and/or
- information and/or data representative of one or more haptic perception modality(ies) associated with each body part for example: such an information may for example correspond to a list of integers. A haptic perception modality corresponds for example to a type of a haptic feedback corresponding to the haptic effect. For example, haptic perception modality/haptic feedback may correspond to one of the followings: 1. Vibrotactile (vibrations and texture), 2. Force (according to time), 3. Force (according to space), 4. Temperature, 5. Smell, 6. Air, and so on; and/or (following information and/or data is for example for each haptic perception modality)

- information and/or data representative of spatial distribution information of the one or more haptic actuators comprised in the haptic device 51: such an information corresponds for example to a list of integers, each integer corresponding for example to the number of haptic actuators of each dimension of a multidimensional space (e.g., 3 integers when the multidimensional space corresponds to a 3D space), or such an information corresponds for example to a list of identifier(s) of one or more active areas. Such an information corresponds advantageously to the spatial distribution information described with reference to FIGS. 3 and 4; and/or
- information and/or data representative of whether all haptic actuators of the haptic device are of the same type: such an information corresponds for example to a Boolean with "True" when all haptic actuators are of the same type and "False" when the haptic actuators are not all of the same type; and/or
- information and/or data representative of the type of haptic actuator and the characteristics of the haptic actuator: such an information is signaled once if all haptic actuators are of the same type and for each type of haptic actuator when the haptic actuators are not all the same type. Such an information corresponds for example to a list of integers, the first integer identifying the type (among a list of types) and the other integers indicating values of a list of determined parameters (that may depend on the type of haptic actuator). The syntax for this information is for example for each type: [Actuator type, lowest value (for example of amplitude and/or frequency), highest value, resonance, Vibration axis (1 for X, 2 for Y, 3 for Z), . . . ]. The actuator type may for example be: 0. None, 1. LRA, 2. VCA, 3. ERM, 4. Piezo, 5. Servo, 6. Pneumatic, 7. Passive Force, 8. Active Force, 9. Peltier Cell; and/or
- information and/or data representative of the ability to process API (Application Program Interface), e.g., API representative of transient signal; and/or
- information and/or data representative of the format or structure of the haptic device data, such an information corresponding for example to an integer identifying a format/structure among a list of known formats/structures.

In a variant, the information representative of ability to process API is deduced from the information representative of the format or structure of the haptic device data.

The haptic device data 511 is for example stored in a memory of the haptic (rendering) engine 50.

At least a part of the received haptic data 500 is advantageously compared with the haptic device data 511 for processing the received haptic data when one or more differences appear from the comparing. The comparing and processing process 502 is for example implemented by a corresponding module 502 of the haptic engine 50, which may be hardware, software or a combination of hardware and software.

Information and/or data which are compared with each other advantageously refer to a same component or element, i.e., for example:

- data of the haptic device data 511 relating to each body part associated with or targeted by the haptic device 51 is compared with data of the container 500 relating to the one or more body parts targeted by the haptic effect; and/or
- data of the haptic device data 511 relating to the configuration of the haptic actuators of the haptic device 51 (e.g., the spatial distribution) is compared with data of the container 500 relating to the reference haptic device; and/or
- data of the haptic device data 511 relating to the rendering capabilities of the haptic device 51 (e.g., haptic perception melody/type of the haptic feedback, type and characteristics of the haptic actuator(s)) is compared with data of the container 500 relating to the haptic effect itself (haptic perception melody/type of the haptic feedback, type of modulation (frequency, amplitude, base) applied to one or more base signals to obtain the haptic effect, rendering parameters relating for example to frequency and/or amplitude, etc.).

The processing that is applied to the received haptic data 500 depend advantageously on the result of the comparing operation(s).

The processing that is applied to the received haptic data 500 according to the result of the comparing operation(s) aims at transform and/or adjust at least a part of the received haptic data 500 to conform with the haptic rendering capabilities of the haptic rendering device 51, said haptic rendering capabilities being described or represented with the haptic device data 511.

According to a First Example

In a first operation, the one or more body parts targeted by the haptic effect and identified or signaled in the received haptic data 500 is/are compared with the one or more body parts associated with or targeted by the one or more haptic actuators of the haptic rendering device 51 (and identified and signaled in the haptic device data 511).

If the body part(s) identified in the received haptic data 500 correspond to (or match) the body part(s) identified in the haptic device data 511, no processing of the received haptic data 500 resulting from the first operation is performed.

If the body part(s) identified in the received haptic data 500 does not correspond to (or does not completely match) the body part(s) identified in the haptic device data 511, then the information (called targeted body part information) comprised in the received haptic data and relating to the body part(s) identified in the received haptic data 500 is adjusted or transformed according to the comparison result in a second operation.

For example, when the body part(s) (both in the received haptic data 500 and haptic device data 511) are identified using the syntax described with reference to FIGS. 1 and 2, i.e., with reference to the first plurality of body parts and the second plurality of body parts of a body model 10, The adjusting or transforming applied to the targeted body part information is performed or processed according to the information comprised in the haptic device data 511 relating to the body part(s), the targeted body part information and to rules determined from the relationships between the body parts and groups of body parts.

The rules are for example determined from the relationships between the body parts and groups of body parts by parsing the tree 20 of FIG. 2.

The rules are for example stored in a memory of the haptic engine 50, the rules being updated when a modification or change is made to the tree 20. A modification corresponds for example to the addition or cancellation of a body part or of a group of body parts, an addition or cancellation of a relationship between different groups and/or body parts.

For example, one or more deepness levels (corresponding to the hierarchical levels described with reference to FIG. 2) are associated with each body part comprised in the tree 20 with regard to the one or more groups said each body part belongs to.

Following deepness levels are for example associated with the body part "First Phalanx" 261:

a first deepness level equal to 1 with reference to the group 254 "Ring";

a second deepness level equal to 2 with reference to the group 242 "Fingers";

a third deepness level equal to 3 with reference to the group 233 "Hand".

Following deepness level is for example associated with the body part "Palm" 241: a first deepness level equal to 1 with reference to the group 254 "Hand".

Considering as an example a targeted body part information identifying the body part "First Phalanx" 261 in the received haptic data 500 and an information identifying the body part "Palm" 241 in the haptic device data 511.

The result of the comparing between each information indicates a difference.

The first group common to the body parts "Palm" 241 and "First Phalanx" 261 in the tree 20 is the group "Hand" 254. Deepness level between the body part "First Phalanx" 261 and the group "Hand" is 3. Deepness level between the body part "Palm" 241 and the group "Hand" is 1.

A maximum deepness level may be associated with each body part to determine whether a haptic affect has to be rendered when the body part targeted by the haptic effect does not match with the body part associated with the haptic device 51.

For example, a rule may be: render the haptic effect only when the difference between the deepness levels with regard to a common group is less or equal to the maximum deepness level.

According to this example, if the maximum deepness level is 2, then the haptic effect targeting the "First Phalanx" 261 has to be rendered on the body part "Palm" 241 as the difference of deepness levels with regard to (wrt.) the group "Hand" is equal to 2.

The targeted body part information (e.g., "First Phalanx") in the received haptic data 500 is transformed into the body part "Palm" and the haptic data 512 resulting from the transformation is transmitted to the haptic device 51.

According to another example, a rule may be: render the haptic effect only when the deepness level associated with targeted body part wrt. the first group common to the targeted body part and the body part identified in the haptic device data 511 is less or equal to the maximum deepness level.

According to this another example, if the maximum deepness level is 2, then the haptic effect targeting the "First Phalanx" 261 won't be rendered on the body part "Palm" 241 as the deepness level wrt. the group "Hand" is greater than to 2.

According to a further example, a rule may be: reduce the amplitude of the haptic effect when the deepness level associated with targeted body part wrt. the first group common to the targeted body part and the body part identified in the haptic device data 511 is greater than the maximum deepness level.

According to this further example, the targeted body part information (e.g., "First Phalanx") in the received haptic data 500 is transformed into the body part "Palm", the amplitude of the haptic effect defined in the received haptic data 500 is adjusted to a reduced level and the haptic data 512 resulting from the transformation made to the received haptic data is transmitted to the haptic device 51 for rendering of the adjusted haptic effect.

Naturally, other rules may be defined to determine whether a haptic effect has to be rendered on a body part associated with the haptic device 51 (and identified in the haptic device data 511) that is different from the body part identified as target body part in the received haptic data 500.

According to a Second Example

In a first operation, the data/information representative of the spatial distribution of the haptic actuators (of the reference haptic device) signaled in the received haptic data 500 is compared with the data/information representative of the spatial distribution of the haptic actuators (of the haptic rendering device 51) signaled in the haptic device data 511.

If the spatial distribution of the reference haptic device signaled in the received haptic data 500 correspond to (or match) the spatial distribution of the haptic rendering device 51 signaled in the haptic device data 511, no processing of the received haptic data 500 resulting from the first operation is performed.

If the spatial distribution of the reference haptic device signaled in the received haptic data 500 does not correspond to (or does not match) the spatial distribution of the haptic rendering device 51 signaled in the haptic device data 511, then the information (called reference haptic device information) comprised in the received haptic data 500 and relating to the haptic actuator(s) targeted to render the haptic effect is adjusted or transformed according to the comparison result in a second operation.

In a second operation, a haptic actuator of the set of haptic actuators of the haptic rendering device 51 is determined according to the spatial distribution information of the reference haptic device (signaled in the received haptic data 500), the spatial distribution information of the haptic rendering device 51 (signaled in the haptic device data 511) and location information representative of the haptic actuator of the reference haptic device or of a point between 2 haptic actuators (the location information being signaled in the received haptic data 500).

The determining of the haptic actuator of the haptic rendering device is for example obtained through the equations 1, 2 and 3 described with reference to FIG. 4.

The data identifying the haptic actuator/point of the reference haptic device in the received haptic data 500 (e.g., parameters $C1_x$, $C1_y$ and $C1_z$) is advantageously transformed to (or replaced with) the data identifying the haptic actuator of the haptic rendering device (e.g., parameters $C2_x$, $C2_y$ and $C2_z$) in the haptic data 512 transmitted to the haptic device 51.

When the reference haptic device information further comprises a first distance information (for example defined with $R1_x$, $R1_y$ and $R1_z$ as explained with reference to FIG. 4) to target a set of haptic actuators from the haptic actuator/point identified with the parameters $C1_x$, $C1_y$ and $C1_z$, then the processing of the received haptic data further comprises the determining of a second distance information, for example through the equations 4, 5 and 6 described with reference to FIG. 4.

The data defining the first distance information in the received haptic data 500 (e.g., parameters $R1_x$, $R1_y$ and $R1_z$) is advantageously transformed to (or replaced with) the data defining the second distance information (e.g., parameters $R2_x$, $R2_y$ and $R2_z$) in the haptic data 512 transmitted to the haptic device 51.

According to a Third Example

In a first operation, the data/information representative of the haptic effect (e.g., type of the haptic effect, rendering parameters such as amplitude or frequency, etc.) signaled in the received haptic data 500 is compared with the data/information representative of the rendering capabilities of the haptic actuators (or of the haptic rendering device 51) signaled in the haptic device data 511.

In a second operation, data/information representative of the haptic effect is processed when the comparison indicates that the rendering capabilities of the haptic actuators does not enable the haptic rendering device 51 to render the haptic effect as it is described in the received haptic data 500.

For example, if the haptic effect is defined with frequential parameters describing frequency variations (e.g., over space and/or over time) and amplitude parameters describing variations (e.g., over space and/or over time) and if the type of actuator(s) signaled in the haptic device data 511 is only configured to (or capable of) render amplitude parameters, then the frequential part of the haptic data is filtered and only the amplitude part is transmitted with the haptic data 512 to the haptic rendering device 51.

For example, if the haptic actuators of the haptic rendering device 51 correspond to LRA, then only amplitude modulation is rendered (and frequency modulation is filtered and not rendered).

According to another example, if the haptic actuators of the haptic rendering device 51 correspond to ERM, then only the amplitude parameters having a value or level greater than a threshold (e.g., 0.5) are kept in the haptic data 512 transmitted to the haptic rendering device 51, meaning that the amplitude parameters having a value or level less than a threshold are filtered from the received haptic data 500 to obtain the haptic data 512 to be transmitted. It results that the ERM only vibrates when the amplitude parameters describing the haptic effect are greater than the threshold.

According to another example, if the haptic actuators of the haptic rendering device 51 correspond to voice coil, amplitude and frequency modulations are both rendered.

According to a further example, when the haptic effect to be rendered is defined through an API (Application Program Interface) or through a call to an API in the received haptic data:

- The haptic rendering engine 50 transmits to the haptic rendering device parameters representative of the API (e.g., frequency and/or amplitude parameters) of the haptic rendering device 51 is capable of rendering haptic effect described through API(s); and
- The haptic rendering engine 50 transforms the parameters of the haptic effect described through the API call into parameters of a signal that the haptic rendering device 51 is capable to render (e.g., a short signal in PCM for voicecoil accepting PCF signals, or a short amplitude burst for LRAs).

An API call associated with a determined signal may be encoded in the received haptic data 500 under the form of:

- an identifier identifying an API call stored in a memory of the haptic (rendering) engine 50; or
- a set of instructions to be executed by the haptic (rendering) engine 50.

An API call may for example be used to render a transient (e.g., a haptic effect corresponding to a shock).

An API call is for example represented and synthesized by a sine function with only one period having a determined duration (e.g., 22 ms).

Figure 6:
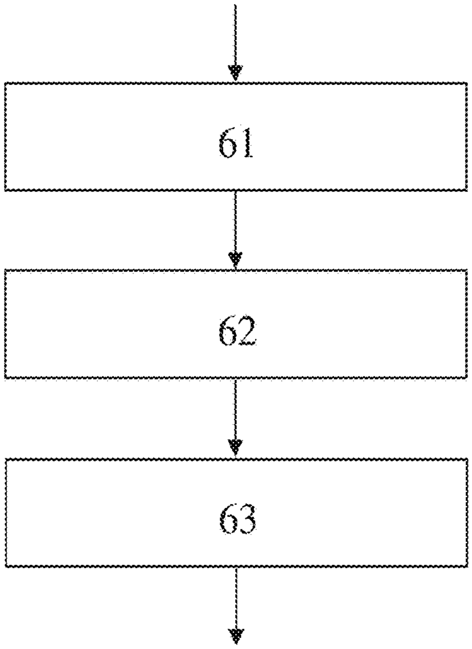
FIG. 6 shows a schematic block diagram of step(s) of a method of transmitting haptic data, in accordance with at least one exemplary embodiment.

FIG. 6 shows a schematic block diagram of steps of a method of transmitting haptic data representative of a haptic effect, in accordance with at least one exemplary embodiment.

In a first step 61, haptic device data representative of haptic rendering capabilities of a haptic rendering device is obtained, for example received from the haptic rendering device.

In a second step 62, the haptic data is determined by processing received haptic data, which is representative of the haptic effect, according to the haptic device data obtained at step 61 to adapt a rendering of the haptic effect, by the haptic rendering device, to the haptic rendering capabilities of the haptic rendering device.

In a third step 63, the haptic data is transmitted to the haptic rendering device.

In an optional fourth step, the haptic effect described with the haptic data is rendered by the haptic rendering device.

Figure 7:
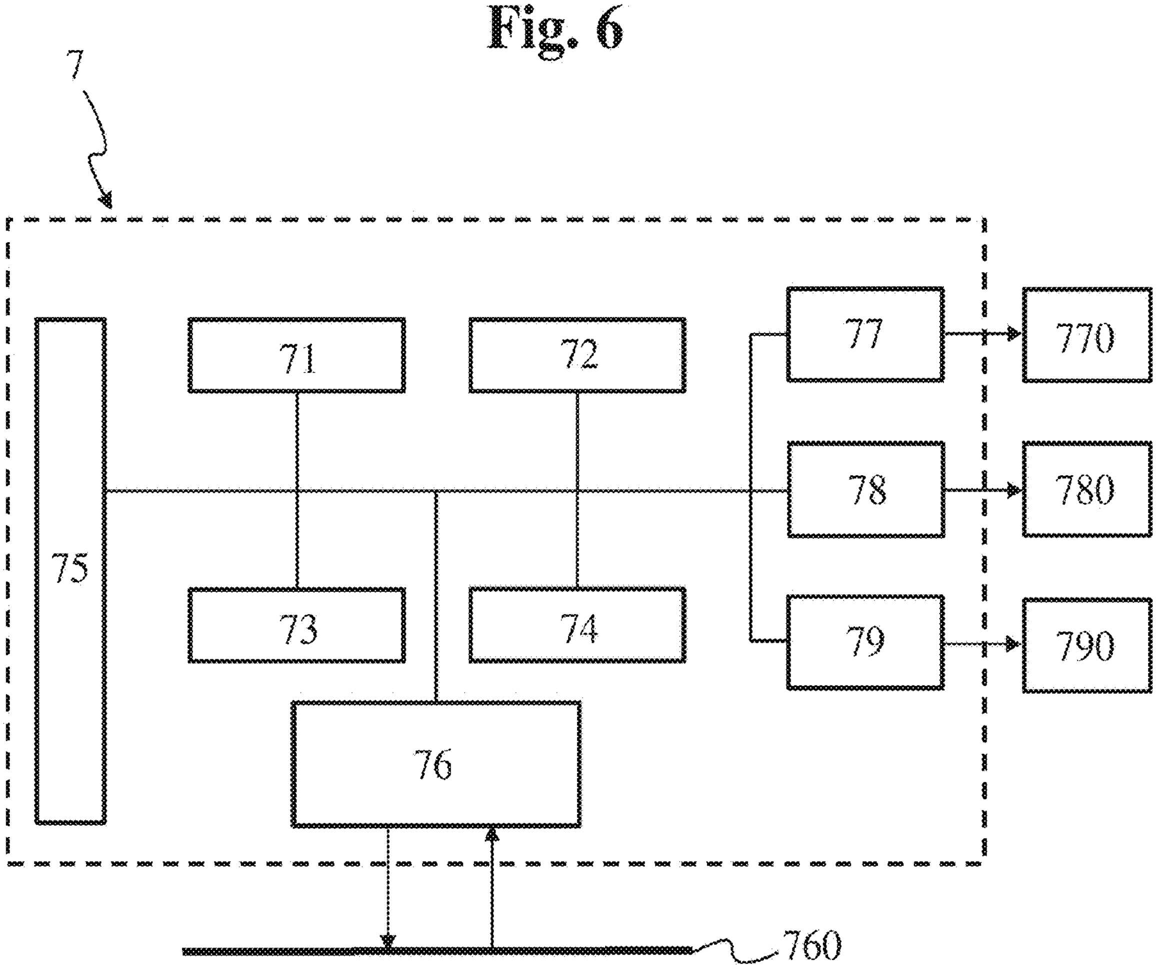
FIG. 7 illustrates a schematic block diagram of an example of a system in which various aspects and exemplary embodiments are implemented.

FIG. 7 shows a schematic block diagram illustrating an example of a system 7 in which various aspects and exemplary embodiments are implemented.

System 7 may be embedded as one or more devices including the various components described below. In various embodiments, the system 7 may be configured to implement one or more of the aspects described in the present application.

Examples of equipment that may form all or part of the system 7 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), haptic sensors or actuators, “caves” (system including multiple displays), servers, haptic encoders, haptic decoders, post-processors processing output from a haptic decoder, pre-processors providing input to a haptic encoder, web servers, set-top boxes, wireless (e.g., Bluetooth®) connected wearable haptic devices, game controller, mouse, mousepad, keyboard, palm rest, chairs, desk, XR headset, headphones, bracelet, head and/or lumbar support device or chair, any other device for processing haptic data or haptic signals, or other communication devices. Elements of system 7, singly or in combination, may be embodied in a single integrated circuit (IC), multiple ICs, and/or discrete components. For example, in at least one embodiment, the processing and encoder/decoder elements of system 7 may be distributed across multiple ICs and/or discrete components. In various embodiments, the system 7 may be communicatively coupled to other similar systems, or to other electronic devices, via, for example, a communications bus or through dedicated input and/or output ports.

The system 7 may include at least one processor 71 configured to execute instructions loaded therein for implementing, for example, the various aspects described in the present application. Processor 71 may include embedded memory, input output interface, and various other circuitries as known in the art. The system 7 may include at least one memory 72 (for example a volatile memory device and/or a non-volatile memory device). System 7 may include a storage device 74, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 74 may include an internal storage device, an attached storage device, and/or a network accessible storage device, as non-limiting examples.

The system 7 may include an encoder/decoder module 73 configured, for example, to process data to provide encoded/decoded haptic signal or data, and the encoder/decoder module 73 may include its own processor and memory. The encoder/decoder module 73 may represent module(s) that may be included in a device to perform the encoding and/or decoding functions. As is known, a device may include one or both of the encoding and decoding modules. Additionally, encoder/decoder module 73 may be implemented as a separate element of system 73 or may be incorporated within processor 71 as a combination of hardware and software as known to those skilled in the art.

Program code to be loaded onto processor 71 or encoder/decoder 73 to perform the various aspects described in the present application may be stored in storage device 74 and subsequently loaded onto memory 72 for execution by processor 71. In accordance with various embodiments, one or more of processor 71, memory 72, storage device 74, and encoder/decoder module 73 may store one or more of various items during the performance of the processes described in the present application. Such stored items may include, but are not limited to, haptic-related data, encoded/decoded data identifying body part(s) and/or group(s) of body part(s) of a body model, a bitstream, matrices, variables, and intermediate or final results from the processing of equations, formulas, operations, and operational logic.

In several embodiments, memory inside of the processor 71 and/or the encoder/decoder module 73 may be used to store instructions and to provide working memory for processing that may be performed during encoding or decoding.

In other embodiments, however, a memory external to the processing device (for example, the processing device may be either the processor 71 or the encoder/decoder module 73) may be used for one or more of these functions. The external memory may be the memory 72 and/or the storage device 74, for example, a dynamic volatile memory and/or a non-volatile flash memory. In at least one embodiment, a fast external dynamic volatile memory such as a RAM may be used as working memory for video coding and decoding operations, such as for MPEG-V.

The input to the elements of system 7 may be provided through various input devices as indicated in block 75. Such input devices include, but are not limited to, (i) an RF portion that may receive an RF signal transmitted, for example, over the air by a broadcaster, (ii) a Composite input terminal, (iii) a USB input terminal, (iv) a phone connector (also known as phone jack, audio jack, headphone jack or jack plug) input terminal and/or (v) an HDMI input terminal.

In various embodiments, the input devices of block 75 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 7 to other electronic devices across USB and/or HDMI connections. It is to be understood that various aspects of input processing, for example, Reed-Solomon error correction, may be implemented, for example, within a separate input processing IC or within processor 71 as necessary. Similarly, aspects of USB or HDMI interface processing may be implemented within separate interface ICs or within processor 71 as necessary. The demodulated, error corrected, and demultiplexed stream may be provided to various processing elements, including, for example, processor 71, and encoder/decoder 73 operating in combination with the memory and storage elements to process the data stream as necessary for presentation on an output device.

Various elements of system 7 may be provided within an integrated housing. Within the integrated housing, the various elements may be interconnected and transmit data therebetween using suitable connection arrangement 75, for example, an internal bus as known in the art, including the I2C bus, wiring, and printed circuit boards.

The system 7 may include communication interface 76 that enables communication with other devices via communication channel 760. The communication interface 76 may include, but is not limited to, a transceiver configured to transmit and to receive data over communication channel 760. The communication interface 76 may include, but is not limited to, a modem or network card and the communication channel 760 may be implemented, for example, within a wired and/or a wireless medium.

Data may be streamed to the system 7, in various embodiments, using a Wi-Fi network such as IEEE 802.11. The Wi-Fi signal of these embodiments may be received over the communications channel 760 and the communications interface 76 which are adapted for Wi-Fi communications. The communications channel 760 of these embodiments may be typically connected to an access point or router that provides access to outside networks including the Internet for allowing streaming applications and other over-the-top communications.

Other embodiments may provide streamed data to the system 7 using a set-top box that delivers the data over the HDMI connection of the input block 75.

Still other embodiments may provide streamed data to the system 7 using the RF connection of the input block 75.

The streamed data may be used as a way for signaling information used by the system 7. The signaling information may comprise the data encoded in a container such as a binary stream or a haptic effect file for example.

It is to be appreciated that signaling may be accomplished in a variety of ways. For example, one or more syntax elements, flags, and so forth may be used to signal information to a corresponding decoder in various embodiments.

The system 7 may provide an output signal to various output devices, including a display 770, speakers 780, and other peripheral devices 790 like haptic devices/actuators.

In various embodiments, control signals may be communicated between the system 7 and the display 770, speakers 780, or other peripheral devices 790 using signaling such as AV.Link (Audio/Video Link), CEC (Consumer Electronics Control), Audio protocols, USB (Universal Serial Bus), HIF UHP (Haptics Industry Forum-Universal Haptic Protocol) or other communications protocols that enable device-to-device control with or without user intervention.

The output devices may be communicatively coupled to system 7 via dedicated connections through respective interfaces 77, 78, and 79.

Alternatively, the output devices may be connected to system 7 using the communications channel 760 via the communications interface 76. The display 770, speakers 780 and/or actuators 790 may be integrated in a single unit with the other components of system 7 in an electronic device such as, for example, a television.

In various embodiments, the display interface 77 may include a display driver, such as, for example, a timing controller (T Con) chip.

The display 770 speakers 780 and/or actuators 790 may alternatively be separate from one or more of the other components, for example, if the RF portion of input 75 is part of a separate set-top box. In various embodiments in which the display 770, speakers 780 and/or actuators 790 may be external components, the output signal may be provided via dedicated output connections, including, for example, HDMI ports, USB ports, or COMP outputs.

In FIGS. 1 to 7, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video and/or haptic encoders, video and/or haptic decoders, post-processors processing output from a video decoder, pre-processors providing input to a video encoder, web servers, set-top boxes, wireless connected wearable haptic devices, e.g., Bluetooth® connected wearable haptic devices, game controller, mouse, mousepad, keyboard, palm rest, chairs, desk, XR headset, headphones, bracelet, head and/or lumbar support device or chair, and any other device for processing haptic data or signals representative of one or more haptic feedback or effect, or other communication devices. As should be clear, the equipment may be mobile.

Computer software may be implemented by the processor 71 or by hardware, or by a combination of hardware and software. As a non-limiting example, the embodiments may be also implemented by one or more integrated circuits. The memory 72 may be of any type appropriate to the technical environment and may be implemented using any appropriate data storage technology, such as optical memory devices, magnetic memory devices, semiconductor-based memory devices, fixed memory, and removable memory, as non-limiting examples. The processor 71 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or an exemplary "in embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received haptic signal (including possibly a received bitstream which encodes one or more haptic signals) in order to produce a final output suitable for rendering haptic effects or for further processing in the reconstructed haptic feedback or effect. In various embodiments, such processes include one or more of the processes typically performed by a decoder. In various embodiments, such processes also, or alternatively, include processes performed by a decoder of various implementations described in this application, for example, Various implementations involve encoding. In an analogous way to the above discussion about "decoding", "encoding" as used in this application may encompass all or part of the processes performed, for example, on an input haptic signal in order to produce an encoded bitstream. In various embodiments, such processes include one or more of the processes typically performed by an encoder. In various embodiments, such processes also, or alternatively, include processes performed by an encoder of various implementations described in this application.

Additionally, this application may refer to "obtaining" various pieces of information. Obtaining the information may include one or more of, for example, estimating the information, calculating the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, or estimating the information.

Also, as used herein, the word "signal" refers to, among other things, indicating something to a corresponding decoder. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of transmitting haptic data representative of a haptic effect, the method comprising the steps of:

obtaining haptic device data representative of haptic rendering capabilities of a haptic rendering device, said haptic device data comprising a second spatial distribution information representative of a second spatial distribution of a set of haptic actuators of said haptic rendering device;

determining said haptic data by processing received haptic data representative of said haptic effect, said received haptic data comprising a first spatial distribution information representative of a first spatial distribution of a set of haptic actuators of a reference haptic device, wherein said processing comprises converting said received haptic data from said first spatial distribution to said second spatial distribution according to said haptic device data to adapt rendering of said haptic effect to said haptic rendering capabilities; and transmitting said haptic data.

2. The method according to claim 1, wherein said received haptic data further comprises a set of information comprising:

targeted body part information representative of a targeted body part of a body model targeted by said haptic effect, and/or rendering information representative of rendering parameters of said haptic effect, wherein said processing comprises:

comparing said haptic device data with said set of information; and adjusting said received haptic data according to a result of said comparing when said result is representative of at least a difference between said haptic device data and said set of information.

3. The method according to claim 2, wherein said processing comprises:

comparing said targeted body part information with first information comprised in said haptic device data and representative of a body part of said body model associated with said haptic rendering device; and adjusting said targeted body part information according to a result of said comparing when said result is representative of a difference between said first information and said targeted body part information.

4. The method according to claim 3, wherein, said body model comprising a first plurality of body parts and a second plurality of groups of body parts, each group of said second plurality comprising at least a body part of said first plurality, said adjusting being according to said first information, said targeted body part information and relationship information representative of relationships between at least a part of the first plurality of body parts and at least a part of the second plurality of groups of body parts.

5. The method according to claim 1, wherein said received haptic data further comprises location information representative of a target location for the haptic effect within the first spatial distribution, and said converting comprises:

comparing said first spatial distribution information with said second spatial distribution information;

determining at least a haptic actuator in said set of haptic actuators of said haptic rendering device according to said first spatial distribution information, said second spatial distribution information and said location information; and adjusting said location information according to said at least a determined haptic actuator of said set of haptic actuators of said haptic rendering device.

6. The method according to claim 5, wherein said first spatial distribution information further comprises a first distance information representative of a distance with respect to said target location, said processing further comprising determining a second distance information according to said first spatial distribution information and said second spatial distribution information, said adjusting comprising replacing said first distance information with said second distance information.

7. The method according to claim 2, wherein said rendering parameters comprise rendering parameters representative of frequency, rendering parameters representative of amplitude and/or rendering parameters representative of phase, said processing comprising:

comparing said rendering information with information representative of a type of said haptic rendering device;

filtering at least a part of said rendering parameters according to a result of said comparing when said result is representative of at least a difference between rendering capabilities associated with said type and said rendering information.

8. The method according to claim 2, wherein said rendering parameters comprise rendering parameters representative of an Application Program Interface call, said processing comprising:

comparing said rendering information with information representative of an ability of said haptic rendering device to process Application Program Interface;

transforming at least a part of said rendering parameters according to a result of said comparing when said result shows an inability of said haptic rendering device to process Application Program Interface, the transforming being according to information representative of a type of said haptic rendering device.

9. The method according to claim 1, wherein said haptic device data comprises at least one selected from the group consisting of:

first data representative of a number of body parts targeted by said haptic rendering device; or second data representative of an identifier of each of said body parts; and/or third data representative of a set of haptic perception modalities comprising at least a haptic perception modality; or fourth data representative of a number of haptic actuators of said haptic rendering device; or fifth data representative of a spatial distribution of said haptic actuators; or sixth data representative of whether said haptic actuators are all of a same type; or seventh data representative of a actuator type for each of said actuators; or eighth data representative of haptic rendering parameters for each of said haptic actuators; or nineth data representative of an ability to process Application Program Interface; or tenth data representative of a format of said haptic device data.

10. The method according to claim 9, wherein said third data is for each of said body parts and said fourth, fifth, sixth, seventh and eighth data is for each haptic perception modality of said set.

11. The method according to claim 1, wherein said haptic device data is received from said haptic rendering device.

12. An apparatus of transmitting haptic data representative of a haptic effect, wherein said apparatus comprising a memory associated with at least a processor configured to implement the method according to claim 1.

13. A non-transitory processor readable medium having stored therein instructions for causing a processor to perform at least the steps of the method according to claim 1.

14. A computer program product comprising instructions of program code for executing the method according to claim 1, when said program is executed on a computer.

* * * * *